United States Patent [19]
Singer

[11] 3,796,561
[45] Mar. 12, 1974

[54] 1,3-DISUBSTITUTED-2-TRICHLOROMETHYL-5-IMINO-1,3-IMIDAZOLIDINONES AS HERBICIDES

[75] Inventor: Malcolm Scott Singer, Richmond, Calif.

[73] Assignee: Chevron Research Company, San Francisco, Calif.

[22] Filed: Aug. 21, 1972

[21] Appl. No.: 282,514

Related U.S. Application Data
[62] Division of Ser. No. 69,466, Sept. 3, 1970, Pat. No. 3,721,679.

[52] U.S. Cl.................................... 71/92, 424/243
[51] Int. Cl................................................ A01n 9/22
[58] Field of Search....................... 71/92; 260/309.7

[56] References Cited
UNITED STATES PATENTS

| | | |
|---|---|---|
| 3,334,098 | 8/1967 | Wright, Jr............................... 71/92 |
| 3,655,689 | 4/1972 | Singer..................................... 71/92 |
| 3,721,679 | 3/1973 | Singer..................................... 71/92 |

FOREIGN PATENTS OR APPLICATIONS

| | | | |
|---|---|---|---|
| 8,598 | 4/1969 | Japan..................................... | 71/92 |
| 8,597 | 4/1969 | Japan..................................... | 71/92 |
| 616,284 | 3/1961 | Canada.................................. | 71/92 |

Primary Examiner—Glennon H. Hollrah
Attorney, Agent, or Firm—G. F. Magdeburger; J. Stoner, Jr.; Raymond Owyang

[57] ABSTRACT

Compound of the formula

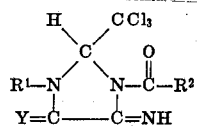

wherein Y is oxygen or sulfur, $R^1$ is alkyl of 1 to 8 carbon atoms substituted with 0 to 3 halogen atoms or aryl of 6 to 10 carbon atoms substituted with 0 to 3 halogen atoms, $R^2$ is hydrogen, $R^1$, an alkoxy of 1 to 8 carbon atoms or phenoxymethyl substituted with 0 to 3 halogen atoms in the benzene nucleus. The compounds are pesticides and/or herbicides.

8 Claims, No Drawings

1,3-DISUBSTITUTED-2-TRICHLOROMETHYL-5-IMINO-1,3-IMIDAZOLIDINONES AS HERBICIDES

This is a division of application Ser. No. 69,466, filed Sept. 3, 1970 now U.S. Pat. No. 3,721,679.

BACKGROUND OF THE INVENTION

1. Field

The subject invention is directed to 1,3-disubstituted-2-trichloromethyl-5-imino-1,3-imidazolidinones and their 4-thio analogs, which find use as herbicides, pesticides, e.g., fungicides and nematocides.

2. Description of the Invention

The compounds of the present invention can be represented by the formula

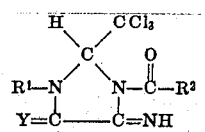

wherein Y is oxygen or sulfur, $R^1$ is alkyl of 1 to 8 carbon atoms substituted with 0 to 3 halogen atoms of atomic number 9 to 35 (fluorine, chlorine or bromine), aryl of 6 to 10 carbon atoms substituted with 0 to 3 halogen atoms of atomic number 9 to 35, $R^2$ is hydrogen, $R^1$ (i.e., alkyl of 1 to 8 carbon atoms substituted with 0 to 3 halogen atoms of atomic number 9 to 35 or aryl or 6 to 10 carbon atoms substituted with 0 to 3 halogen atoms of atomic number 9 to 35), an alkoxy of 1 to 8 carbon atoms, or phenoxyalkyl the alkyl group having 1 to 4 carbon atoms, substituted with 0 to 3 halogen atoms on the benzene nucleus.

Preferably $R^1$ is alkyl of 1 to 4 carbon atoms, alkyl of 1 to 4 carbon atoms substituted with 1 to 3 halogen atoms of atomic number 9 to 35, phenyl, phenyl substituted with 1 to 3 halogen atoms of atomic number 9 to 35, $R^2$ is hydrogen, alkyl of 1 to 4 carbon atoms, alkyl of 1 to 4 carbon atoms substituted with 1 to 3 halogen atoms of atomic number 9 to 35, phenyl, phenyl substituted with 1 to 3 halogen atoms of atomic number 9 to 35, alkoxy of 1 to 4 carbon atoms, phenoxymethyl or phenoxymethyl substituted with 1 to 3 halogen atoms of atomic number 9 to 35 on the benzene nucleus.

Still more preferably Y is oxygen or sulfur, $R^1$ is alkyl of 1 to 4 carbon atoms or phenyl, $R^2$ is hydrogen, alkyl of 1 to 4 carbon atoms, alkyl of 1 -butylphenyl, to 4 carbon atoms substituted with 1 to 3 halogen atoms of atomic number 17 to 35, phenyl, phenyl substituted with 1 to 3 halogen atoms of atomic number 17 to 35, or phenoxymethyl substituted with 1 to 2 halogen atoms of atomic number 17 to 35 on the benzene nucleus.

Preferably the halogen substituents for $R^1$ and $R^2$ will be chlorine or bromine, or still more preferably chlorine. Preferably the number of halogen substituents will not exceed 2 on any particular radical.

Representative radicals which $R^1$ can represent include methyl, ethyl, n-propyl, isopropyl, n-butyl, isobutyl, pentyl, hexyl, heptyl, octyl, chloromethyl, bromomethyl, fluoromethyl, trichloromethyl, 1-chloroethyl, 1,1,2-trichloroethyl, 3,3,3-trichloropropyl, phenyl, o-methylphenyl, o-butylphenyl, p-butyl-phenyl, o-chlorophenyl, p-chlorophenyl, m-bromophenyl, o-chloro-p-bromophenyl.

Representative radicals which $R^2$ can represent include in addition to those listed for $R^1$, hydrogen, phenoxymethyl, phenoxyethyl, phenoxypropyl, phenoxybutyl, o-chlorophenoxymethyl, p-chlorophenoxymethyl, o,p-dichlorophenoxymethyl, m-bromophenoxyethyl, methoxy, ethoxy, isopropoxy, butoxy, hexoxy, octoxy, etc.

Representative compounds of the present invention include 1-formyl-2-trichloromethyl-3-phenyl-5-imino-1,3-imidazolidinone, 1-formyl-2-trichloromethyl-3-phenyl-4-thio-5-imino-1,3-imidazolidinone, 1-formyl-2-trichloromethyl-3-methyl-5-imino-1,3-imidazolidinone, 1-formyl-2-trichloromethyl-3-o-chlorophenyl-5-imino-1,3-imidazolidinone, 1-acetyl-2-trichloromethyl-3-methyl-5-imino-1,3-imidazolidinone, 1-acetyl-2-trichloromethyl-3-n-butyl-5-imino-1,3-imidazolidinone, 1-acetyl-2-trichloromethyl-3-phenyl-5-imino-1,3-imidazolidinone, 1-acetyl-2-trichloromethyl-3-p-butylphenyl-4-thio-5-imino-1,3-imidazolidinone, 1-propionyl-2-trichloromethyl-3-phenyl-5-imino-1,3-imidazolidinone, 1-butyryl-2-trichloromethyl-3-phenyl-5-imino-1,3-imidazolidinone, 1-pentanoyl-2-trichloromethyl-3-o,p-dichlorophenyl-4-thio-5-imino-1,3-imidazolidinone, 1-hexanoyl-2-trichloromethyl-3-phenyl-5-imino-1,3-imidazolidinone, 1-octanoyl-2-trichloromethyl-3-tolyl-4-thio-5-imino-1,3-imidazolidinone, 1-(2-chloroacetyl)-2-trichloromethyl-3-hexyl-5-imino-1,3-imidazolidinone, 1-(2-bromoacetyl)-2-trichloromethyl-3-phenyl-5-imino-1,3-imidazolidinone, 1-(3-chloropropionyl)-2-trichloromethyl-3-p-fluorophenyl-4-thio-5-imino-1,3-imidazolidinone, 1-benzoyl-2-trichloromethyl-3-phenyl-5-imino-1,3-imidazolidinone, 1-benzoyl-2-trichloromethyl-3-n-butyl-5-imino-1,3-imidazolidinone, 1-benzoyl-2-trichloromethyl-3-phenyl-4-thio-5-imino-1,3-imidazolidinone, 1-(o-chlorobenzoyl)-2-trichloromethyl-3-ethyl-5-imino-1,3-imidazolidinone, 1-phenoxyacetyl-2-trichloromethyl-3-methyl-5-imino-1,3-imidazolidinone, 1-phenoxypropenyl-2-trichloromethyl-3-ethyl-4-thio-5-imino-1,3-imidazolidinone, 1-(2-chlorophenoxyacetyl)-2-trichloromethyl-3-methyl-5-imino-1,3-imidazolidinone, 1-(3-chlorophenoxyacetyl)-2-trichloromethyl-3-phenyl-5-imino-1,3-imidazolidinone, 1-(2,4-dichlorophenoxyacetyl)-2-trichloromethyl-3-methyl-4-thio-5-imino-1,3-imidazolidinone, 1-(2,4,6-trichlorophenoxy-butyryl)-2-trichloromethyl-3-methyl-5-imino-1,3-imidazolidinone, 1-(3-bromophenoxyacetyl)-2-trichloromethyl-3-(4-chlorophenyl)-4-thio-5-imino-1,3-imidazolidinone, 1-benzoyl-2-trichloromethyl-carbomethoxy-5-imino-1,3-imidazolidinone.

The compounds of the present invention can be prepared by the reaction of an N-substituted cyanoformamide or cyanothioformamide with an N-(1,2,2,2-tetrachloroethyl)carboxamide. This reaction may be written as follows:

$$R^1-NH-\overset{Y}{\overset{\|}{C}}-C\equiv N + R^2-\overset{O}{\overset{\|}{C}}-NH-\overset{Cl}{\overset{|}{C}H}-CCl_3 \longrightarrow$$

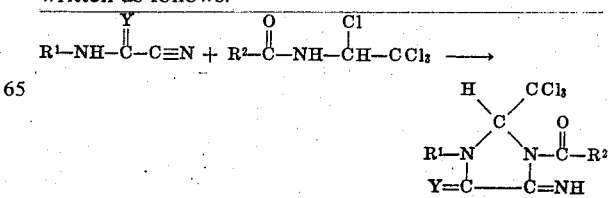

wherein $R^1$, $R^2$ and Y have the same meaning as before.

In this reaction, approximately equal molar quantities of the reactants are combined, preferably in an inert solvent. Suitable solvents are the aromatic hydrocarbons such as benzene, toluene, and xylene. The quantity of solvent used is optional, but usually an amount of from about equal weight to about 10 times the weight of the reactants is sufficient. The reaction is initiated by adding an organic amine base, e.g., triethylamine, piperidine, trimethylamine, quinuclidine, pyridine, etc. Triethylamine is preferred. At least a molar amount of amine, based on the carboxamide, is used.

The reaction is carried out at temperatures in the range of 10° C. to 50° C., preferably at 20° C. to 30° C. The reaction is exothermic and cooling is sometimes used to limit the temperature rise. Typically, batch reactions are completed in from 1 to 10 hours at ambient temperatures. The product is usually recovered by evaporation of the solvent, followed by a water wash to remove any amine hydrochloride salt. Purification is readily accomplished by recrystallization from a suitable liquid, such as ethanol, dimethylformamide/ethanol, isopropanol/water, and 1,2-dimethoxyethane.

The N-substituted cyanoformamide and thioformamides used in the above reaction are readily prepared by the addition of hydrogen cyanide to the corresponding isocyanate or by treating isothiocyanate with an alkali metal cyanide, e.g., KCN, in aqueous ethanol followed by acidification. The reactions are as follows:

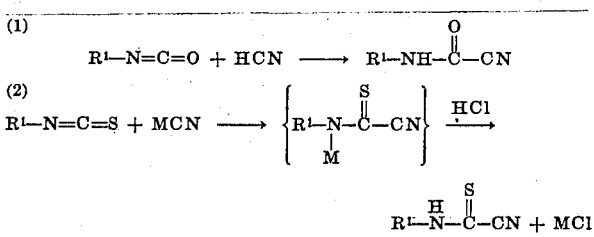

wherein $R^1$ has the same meaning as before and M refers to an alkali metal.

Generally a slight molar excess of liquid hydrogen cyanide is added to the isocyanate dissolved in an inert solvent such as 1,2-dimethoxyethane. The quantity of solvent is not critical and may range from one-half to 10 times by weight of the isocyanate compound. The reaction is usually carried out in the cold; that is, temperatures below 20° C. For best results, the hydrogen cyanide is added slowly in order to control the temperature. The product may be isolated by evaporating off the solvent, or preferably it may be used in the solvent without further workup.

For the reaction of the alkali metal cyanide with the isothiocyanate, KCN, is preferred. The alkali metal cyanide should be in slight molar excess. The solvent should be aqueous ethanol, the quantities not being critical and may range from one-half to 10 times by weight of the isothiocyanate compound. The reaction conditions are generally the same as those indicated above for hydrogen cyanide reacted with isocyanate. Following formation of the intermediate HCl or another acid is added to form the N-substituted thioformamide. Generally the acid will be present in an equivalent amount to that of the alkali metal cyanide.

The N-(1,2,2,2-tetrachloroethyl)carboxamides are prepared by condensing a carboxamide with chloral, followed by reaction with thionylchloride. This reaction occurs as follows:

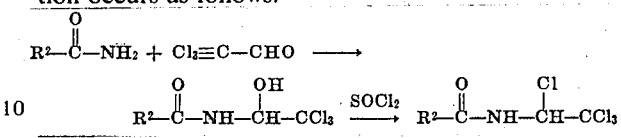

wherein $R^2$ is as defined previously.

The condensation reaction is carried out neat or in a solvent such as an aromatic hydrocarbon, e.g., benzene, toluene, and xylene, or a halogenated hydrocarbon, e.g., chloroform. The quantity of solvent will usually range from about one-half to 10 times by weight of the carboxamide. Essentially equal molar amounts of chloral and carboxamide are combined, preferably without a solvent at about ambient temperatures, i.e., 10°–30° C. When this reaction is complete, then at least a molar amount of thionylchloride is added. This reaction is usually carried out at elevated temperatures. Under these conditions, the sulfur dioxide and hydrogen chloride by-products are volatilized from the reaction mixture as soon as they are formed. The product, when prepared without solvent, may be used as obtained for further reaction. When prepared in a solvent it may preferably be used in that solvent without isolation, or it may be isolated by evaporation.

The present invention will be better understood by reference to the following examples of the preparation of representative compounds.

Example 1
1-formyl-2-trichloromethyl-3-phenyl-5-imino-1,3-imidazolidinone

N-phenylcyanoformamide, 7.3 g. (0.05 mole), and N-(1,2,2,2-tetrachloroethyl)formamide, 10.55 g. (0.05 mole), were mixed with 25 g. of benzene in a 100 ml. flask. Then 5.05 g. (0.05 mole) of triethylamine was added slowly with stirring. The temperature rose somewhat. Stirring was continued for 4 hours, and then the reaction mixture was allowed to stand for 16 hours. A precipitate was removed by filtration and washed with water to give 4.7 g. of product having a melting point of 160-3° C. Analysis for chlorine gave 36.55% (found) vs. 33.25% (calculated). An infrared spectra was consistent with the assigned structure and had strong adsorptions at 690, 830, 1050, 1220, 1475 and 1675 cm$^{-1}$.

Example 2
1-benzoyl-2-trichloromethyl-3-methyl-4-thio-5-imino-1,3-imidazolidinone N-methyl cyanothioformamide, 5.0 g. (0.05 mole), and N-(1,2,2,2-tetrachloroethyl)benzamide, 14.3 g. (0.05 mole), were mixed with 25 g. of benzene in a 75 ml. flask. Then 5.0 g. (0.05 mole) of triethylamine was added slowly. The reaction mixture was allowed to stand 16 hours. A water soluble precipitate was removed by filtration, and the resulting filtrate was evaporated to dryness. The solid recovered in this way was recrystallized from an ethanol/water solution to give 6.0 g. of product, m.p., 122°–124° C. Analysis gave chlorine, 29.85%, and sulfur, 9.17% (found), vs. chlorine, 30.42%, and sulfur, 9.13% (calculated). An infrared spectra had strong adsorption at 695, 715, 810, 835, 920, 1,075, 1,450 and 1,675 cm$^{-1}$.

Other compounds of the present invention were prepared and are tabulated in Table I.

throughout 0.1 acre-foot. For post-emergence applica-

TABLE I

| Compound | S | | Cl | | Melting Point °C. |
|---|---|---|---|---|---|
| | Calculated | Found | Calculated | Found | |
| 1-benzoyl-2-trichloromethyl-3-methyl-5-imino-1,3-imidazolidinone | — | — | 31.9 | 31.1 | 136–140 |
| 1-benzoyl-2-trichloromethyl-3-n-butyl-5-imino-1,3-imidazolidinone | — | — | 28.3 | 30.3 | 110–118 |
| 1-(2-chloroacetyl)-2-trichloromethyl-3-phenyl-5-imino-1,3-imidazolidinone | — | — | 38.5 | 36.6 | 124–126 |
| 1-(2-chloroacetyl)-2-trichloromethyl-3-methyl-5-imino-1,3-imidazolidinone | — | — | 46.3 | 41.8 | 213–215 |
| 1-(2-chloroacetyl)-2-trichloromethyl-3-phenyl-4-thio-5-imino-1,3-imidazolidinone | 8.3 | 8.2 | 36.9 | 36.0 | 130** |
| 1-(2-chloroacetyl)-2-trichloromethyl-3-methyl-4-thio-5-imino-1,3-imidazolidinone | 9.9 | 10.0 | 44.0 | 41.9 | 150** |
| 1-(2-chloroacetyl)-2-trichloromethyl-3-n-butyl-5-imino-1,3-imidazolidinone | — | — | 40.7 | 38.5 | 117–121 |
| 1-acetyl-2-trichloromethyl-3-methyl-4-thio-5-imino-1,3-imidazolidinone | 10.9 | 11.1 | 36.0 | 36.9 | 114–118 |
| 1-(2-chlorophenoxyacetyl)-2-trichloromethyl-3-methyl-4-thio-5-imino-1,3-imidazolidinone | 7.7 | 7.8 | 34.2 | 32.7 | 176–179 |
| 1-(2,4-dichlorophenoxyacetyl)-2-trichloromethyl-3-methyl-4-thio-5-imino-1,3-imidazolidinone | 7.1 | 7.2 | 39.5 | 37.5 | 158–161 |
| 1-carbethoxy-2-trichloromethyl-3-phenyl-5-imino-1,3-imidazolidinone | 11.5* | 10.4* | 29.2 | 27.6 | 75–83 |
| 1-carbethoxy-2-trichloromethyl-3-phenyl-4-thio-5-imino-1,3-imidazolidinone | 8.41 | 8.66 | 28.0 | 27.1 | 137–140 |

*Nitrogen analysis
**Decomposed

UTILITY

The compounds of the present invention are useful herbicides and pesticides. In general the compounds are very specific in their activity. Thus some of the compounds have activity towards fungi whereas others have high activity towards viruses, such as tobacco mosaic virus. Others have high activity towards nematodes whereas others have high activity towards herbicides. Even among those compounds which are useful as herbicides, there is a great amount of specificity. Thus some of the compounds are pre-emergence herbicides whereas others are post-emergence herbicides. Some of the compounds are specific to broadleaved plants as opposed to the grasses.

The compounds of the present invention are herbicidal, with the exception of the compounds in which Y is O and $R^2$ is alkoxy. For pre-emergence control of undesirable vegetation these imidazolidinones will be applied in herbicidal quantitites to the environment, e.g., soil infested with seeds and/or seedlings of such vegetation. Such application will inhibit the growth of or kill the seeds, germinating seeds and seedlings. For post-emergence applications the imidazolidinones of the present invention will be applied direct to the foliage or other plant parts. Some of the compounds are effective against weed grasses as well as broad-leaved weeds. Some are selective with respect to the type of application and the type of weed.

The amount of imidazolidinone administered will vary with the particular plant part or plant growth medium which is to be contacted, the general location of application, i.e., sheltered areas such as greenhouses as compared to exposed areas such as fields, as well as the desired type of control. For pre-emergent control of most plants dosages in the range of about 0.5 to 20 lbs. per acre will be used. Such administration will give a concentration of about 2 to 80 ppm. urea distributed throughout 0.1 acre-foot. For post-emergence application, such as foliar spray application, compositions containing about 0.5 to 8 lbs. imidazolidinone per 100 gal. spray will be used. Such application is equivalent to about 0.5 to 20 lbs. imidazolidinone per acre.

The herbicidal compositions of this invention comprise a herbicidal amount of one or more of the above described imidazolidinone intimately admixed with a biologically inert carrier. The carrier may be a liquid diluent such as water or acetone or a solid. The solid may be in the form of dust powder or granules. These compositions will also usually contain adjuvants such as a wetting or dispersing agent to facilitate their penetration into the plant growth media or plant tissue and generally enhance their effectiveness. These compositions may also contain other pesticides, stabilizers, conditioners, fillers and the like.

Pre- and post-emergence herbicidal tests on representative imidazolidinones of this invention were made using the following methods:

PRE-EMERGENCE TEST

An acetone solution of the test imidazolidinone was prepared by mixing 750 mg. imidazolidinone, 220 mg. of a nonionic surfactant and 25 ml. of acetone. This solution was added to approximately 125 ml. of water containing 156 mg. of surfactant.

Seeds of the test vegetation were planted in a pot of soil and the imidazolidinone solution was sprayed uniformly onto the soil surface at a dose of 100 mg. per $cm^2$. The pot was watered and placed in a greenhouse. The pot was watered intermittently and was observed for seedling emergence, health of emerging seedlings, etc. for a 3-week period. At the end of this period the herbicidal effectiveness of the imidazolidinone was rated based on the physiological observations. A 0 to 100 scale was used; 0 representing no phytotoxicity, 100 representing complete kill.

POST-EMERGENCE TEST

The test imidazolidinone was formulated in the same manner as described above for the pre-emergence test. The concentration of the imidazolidinone in this formulation was 5,000 ppm. This formulation was uniformly sprayed on 2 replicate pots of 24-day-old plants (approximately 15 to 25 plants per pot) at a dose of 100 mg. per cm$^2$. After the plants had dried, they were placed in a greenhouse and then watered intermittently at their bases as needed. The plants were observed periodically for phytotoxic effects and physiological and morphological responses to the treatment. After 3 weeks the herbicidal effectiveness of the imidazolidinone was rated based on these observations. A 0 to 100 scale was used; 0 representing no phytotoxicity, 100 representing complete kill.

The results of these tests appear in Table II.

liquids as water, kerosene, xylene, alcohols, alkylated naphthylene and glycols. Typical solids which may be incorporated with the imidazolidinones include the natural clays, such as kaolin clays, diatomaceous earth, synthetic fine silica, talc, pyrophyllite, etc.

Fungicidal formulations may also contain stabilizers, spreading agents, sticking agents, fillers, other compatible pesticides and the like.

To exhibit the activity of certain of the compounds of the present invention against fungi, the following test was made.

EXAMPLE

A number of the compounds were tested for effectiveness against spores by means of a variation of "The

TABLE II

| Compound | Herbicidal Effectiveness Pre/Post | | | | | |
|---|---|---|---|---|---|---|
| | O | W | C | M | P | L |
| 1-formyl-2-trichloromethyl-3-phenyl-5-imino-1,3-imidazolidinone | — | — | — | — | 50/— | 50/— |
| 1-benzoyl-2-trichloromethyl-3-methyl-5-imino-1,3-imidazolidinone | — | — | — | —/40 | — | — |
| 1-benzoyl-2-trichloromethyl-3-n-butyl-5-imino-1,3-imidazolidinone | — | — | — | — | 70/— | — |
| 1-(2-chloroacetyl)-2-trichloromethyl-3-methyl-5-imino-1,3-imidazolidinone | — | — | —/85 | — | — | 0/100 |
| 1-(2-chloroacetyl)-2-trichloromethyl-3-phenyl-4-thio-5-imino-1,3-imidazolidinone | — | — | —/90 | — | — | —/100 |
| 1-(2-chloroacetyl)-2-trichloromethyl-3-methyl-4-thio-5-imino-1,3-imidazolidinone | — | — | 50/99 | —/100 | —/90 | —/100 |
| 1-acetyl-2-trichloromethyl-3-methyl-4-thio-5-imino-1,3-imidazolidinone | — | — | — | 0/80 | — | — |
| 1-(2-chlorophenoxyacetyl)-2-trichloromethyl-3-methyl-4-thio-5-imino-1,3-imidazolidinone | — | — | — | 100/0 | 75/0 | — |
| 1-(2,4-dichlorophenoxyacetyl)-2-trichloromethyl-3-methyl-4-thio-5-imino-1,3-imidazolidinone | 75/0 | 85/— | 100/— | 100/100 | 100/95 | 100/100 |
| 1-carbethoxy-2-trichloromethyl-3-phenyl-4-thio-5-imino-1,3-imidazolidinone | — | — | — | 60/— | 50/— | 60/— |

O=Wild Oats (*Avena fatua*)
W=Watergrass (*Echinochloa crusgalli*)
C=Crabgrass (*Digitaria sanguinalis*)
M=Mustard (*Brassica arvensis*)
P=Pigweed (*Amaranthus retroflexus*)
L=Lambsquarter (*Chenopodium album*)

The compounds of the present invention find use in the control of fungi. When used as fungicides the imidazolidinones of this invention will be formulated and applied in fungicidal amounts by conventional art methods to fungi or hosts which are subject to fungus attack, especially vegetative hosts such as plants, plant seeds, etc. The amount used will, of course, depend upon several factors such as the host, the type of fungus, the particular imidazolidinone, etc. The amount generally will range from 2 to 90%. The imidazolidinones may be combined with inert liquids or solid carriers as powders, solutions, dispersions, etc. for such use.

The imidazolidinones of this invention will generally be admixed with biologically inert liquids or solids in an amount of from about 0.005 to 95 weight percent. Higher or lower amounts can be used to advantage. Preferably from 1 to 50 weight percent of the composition will be the imidazolidinones. Typical of the liquid carrier which may be admixed with the imidazolidinones of this invention include, in addition to acetone, such Standard Spore Slide-Germination Method for Determining Fungicital Activity," described in the *American Phytopathological Society Journal*, Volume 33, pages 627–632 (1943). The method is designed to measure the fungitoxic activity of fungicidal chemicals, their activity being expressed in terms of percent inhibition of germination of fungus spores. Each compound toxicant to be tested was dissolved in acetone to a concentration of 100 ppm. These solutions were then pipetted into the wells of depression slides and allowed to dry. The wells were filled with a spore suspension of the specified test organism. A 10-fold greater volume of suspension was used than that used to apply the toxicant so that the slide concentration of toxicant was 10 ppm. The spores were then incubated in a moist chamber overnight. A group of 100 spores was examined and the number of spores germinated and not germinated was counted and recorded to show the biological activity in terms of the percent germination inhibition. Table III reports the results of this testing.

TABLE III

| Compound | % Control | |
|---|---|---|
| | Monolinia fructicola | Alternaria solani |
| 1-(2-chloroacetyl)-2-trichloro-methyl-3-methyl-4-thio-5-imino-1,3-imidazolidinone | 100 | 100 |
| 1-acetyl-2-trichloromethyl-3-methyl-4-thio-5-imino-1,3-imidazolidinone | 100 | — |

Some of the compounds of this invention exhibit good nematocidal activity. In general those compounds wherein Y is O or S, $R^1$ is alkyl, haloalkyl, aryl or haloaryl, $R^2$ is alkyl, haloalkyl, aryl or haloaryl are preferred for nematocidal control. Further when $R^2$ is aryl and $R^1$ is alkyl, it is preferred that the alkyl be at least ethyl or higher. Thus the imidazolidinones of this invention may be used to control plant-parasitic nematodes by exposing them to a toxic amount of the imidazolidinone. Thus, these imidazolidinones will normally be applied to nematode-infested soil at dosages in the range of 3 to 40 lbs. per acre. They may be applied as liquid formulations by spraying or injection. The liquid formulations of these imidazolidinones may be solutions, dispersions, or emulsions. Typical solvents which may be used are aromatics such as xylene, toluene and benzene, ketones such as cyclohexanone and the like. These liquid formulations will usually contain a wetting agent to facilitate the imidazolidinone's penetration into the soil and generally enhance its effectiveness. They may also be applied as solid formulations containing carriers such as soil, sawdust, clay and the like. When used as a solid, these imidazolidinones will usually be plowed into the soil. Following their application to the soil, the soil will be watered to disperse the imidazolidinone below ground level.

The nematocidal activity of several of the imidazolidinones of this invention are illustrated by the following method.

A 0.38 ml. portion of a 3% acetone solution of the test compound was diluted with 1 ml. acetone. The resulting solution was homogenously mixed with 20 cc. of vermiculite. The treated vermiculite was then mixed homogenously with 750 g. of soil, dry weight basis, which was severely infested with free-living nematodes (mixed culture of Meloidogyne javanica and Meloidogyne incognita). This mixing gave a concentration of approximately 15 parts of the test compound per million parts of soil. This treated soil was stored for 4 days at 65°–75° F. It was then divided equally into 3 parts, each of which was put into a separate pot and kept for another 3 days. A 3-week old tomato (v. Bonny Best) seedling was then transplanted into each pot and incubated for 13 days under greenhouse conditions. After this period they were removed and the soil was washed from their roots. The nematocidal effectiveness of the test compound was determined by observing each plant for signs of nematode invasion (number of galls formed, stunting, etc.).

The results of these tests, reported as the average of the 3 replicates on a 0 to 100 basis — 0 indicating no effectiveness; 100 indicating complete effectiveness — are reported in Table IV.

TABLE IV

| Compound | Nematocidal Activity % Control |
|---|---|
| 1-benzoyl-2-trichloromethyl-3-methyl-4-thio-5-imino-1,3-imidazolidinone | 96 |
| 1-benzoyl-2-trichloromethyl-3-n-butyl-5-imino-1,3-imidazolidinone | 89 |
| 1-(2-chloroacetyl)-2-trichloromethyl-3-n-butyl-5-imino-1,3-imidazolidinone | 81 |
| 1-acetyl-2-trichloromethyl-3-methyl-4-thio-5-imino-1,3-imidazolidinone | 80 |

At least two of the compounds, namely 1-(2-chloroacetyl)-2-trichloromethyl-3-phenyl-5-imino-1,3-imidazolidinone and 1-carbethoxy-2-trichloromethyl-3-phenyl-4-thio-5-imino-1,3-imidazolidinone were found effective in the control of tobacco mosaic virus on bean leaves.

As will be evident to those skilled in the art, various modifications on this invention can be made or followed, in the light of the foregoing disclosure and discussion, without departing from the spirit or scope of the disclosure or from the scope of the following claims.

I claim:

1. A herbicidal composition comprising a herbicidal quantity of the compound of the formula

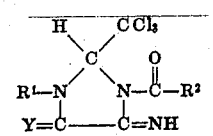

wherein Y is oxygen or sulfur, $R^1$ is lower alkyl substituted with 0 to 3 chlorine atoms or phenyl substituted with 0 to 2 chlorine atoms, $R^2$ is hydrogen, lower alkyl substituted with 0 to 3 chlorine atoms, phenyl substituted with 0 to 2 chlorine atoms lower alkoxy or phenoxymethyl, substituted with 0 to 2 chlorine atoms on the benzene nucleus, with the proviso that when $R^2$ is alkoxy Y is sulfur, admixed with a biologically inert carrier therefor.

2. Method for controlling undesirable vegetation which comprises applying a herbicidal amount of the compound of claim 1 to said vegetation or the environment thereof.

3. The herbicidal composition of claim 1 wherein $R^2$ is hydrogen, alkyl of 1 to 4 carbon atoms substituted with 0 to 3 chlorine atoms, phenyl substituted with 0 to 2 chlorine atoms, alkoxy of 1 to 4 carbon atoms, phenoxymethyl, substituted with 0 to 2 chlorine atoms on the benzene nucleus.

4. The herbicidal composition of claim 1 wherein $R^1$ is alkyl of 1 to 4 carbon atoms or phenyl, $R^2$ is hydrogen, alkyl of 1 to 4 carbon atoms substituted with 0 to 3 chlorine atoms, phenyl substituted with 0 to 2 chlorine atoms or phenoxymethyl substituted with 0 to 2 chlorine atoms on the benzene nucleus.

5. The herbicidal composition of claim 1 wherein $R^1$ is alkyl of 1 to 4 carbon atoms or phenyl, $R^2$ is hydrogen, methyl, chloromethyl, phenyl or phenoxymethyl substituted with 1 to 2 chlorine atoms on the benzene nucleus.

6. The method of claim 2 wherein $R^2$ is hydrogen, alkyl of 1 to 4 carbon atoms substituted with 0 to 3 chlorine atoms, phenyl substituted with 0 to 2 chlorine atoms, alkoxy of 1 to 4 carbon atoms, phenoxymethyl, substituted with 0 to 2 chlorine atoms on the benzene nucleus.

7. The method of claim 2 wherein $R^1$ is alkyl of 1 to 4 carbon atoms or phenyl, $R^2$ is hydrogen, alkyl of 1 to 4 carbon atoms substituted with 0 to 3 chlorine atoms, phenyl substituted with 0 to 2 chlorine atoms or phenoxymethyl substituted with 0 to 2 chlorine atoms on the benzene nucleus.

8. The method of claim 2 wherein $R^1$ is alkyl of 1 to 4 carbon atoms or phenyl, $R^2$ is hydrogen, methyl, chloromethyl, phenyl or phenoxymethyl substituted with 1 to 2 chlorine atoms on the benzene nucleus.

* * * * *